June 12, 1934.  J. L. McMILLIN  1,962,664

LICENSE PLATE HOLDER

Filed Aug. 28, 1933

Inventor
Jesse L. McMillin

By Murray and Zugelter
Attorneys

Patented June 12, 1934

1,962,664

UNITED STATES PATENT OFFICE 1,962,664

LICENSE PLATE HOLDER

Jesse L. McMillin, Cincinnati, Ohio

Application August 28, 1933, Serial No. 687,099

12 Claims. (Cl. 40—125)

This invention relates to an anti-theft device for holding vehicle license plates and the like.

An object of the invention is to provide a holder of the character stated, which so effectively grips and encloses a license plate that removal of the plate therefrom is rendered practically impossible.

Another object of the invention is to provide a self-locking holder for license plates and the like, which is so constructed that even the destruction of the lock will not result in release of the license plate.

A further object of the invention is the provision of simple and inexpensive means for accomplishing the foregoing objects.

Another object is to provide a device of the character stated, which is so constructed that the license plate could not be pried from the device without very noticeably mutilating the plate, thereby leading to detection of the unauthorized removal.

The foregoing and other objects are attained by the means described herein and disclosed in the accompanying drawing, in which.

Figure 1:
Fig. 1 is a perspective view of the device of the invention, part being broken away.

The device of the present invention is designed primarily to preclude unauthorized removal of license plates from vehicles, however it may be used to advantage for holding other types of plates or tags, as will be understood. The device comprises a back member or base 6 which may be welded, riveted, bolted or otherwise permanently fixed to a part of the vehicle, and a double cover member constituted of a panlike part 7 and an open faced frame member 8. The license plate 9 is adapted to be secured between the members 7 and 8 so as to be visible through the aperture 10 in the frame member 8, (Fig. 1).

As is most clearly shown in Fig. 1, the frame member 8 has four rearwardly extended walls 12 which preferably cover entirely the side and end walls 13 and 14, respectively, of the back member 6. The inwardly projecting flange 15 of member 8 carries a series of studs 16 which extend rearwardly through the license plate and the face 17 of member 7, and into the interior of the back member 6 where said studs engage suitable latches 18 for holding the parts together in the manner of Fig. 1. Apertures or perforations in the member 7, indicated at 19, permit the studs to extend through to the interior of the back member 6. The license plate is of course perforated along its edges to coincide with the apertures 19.

Figure 2:
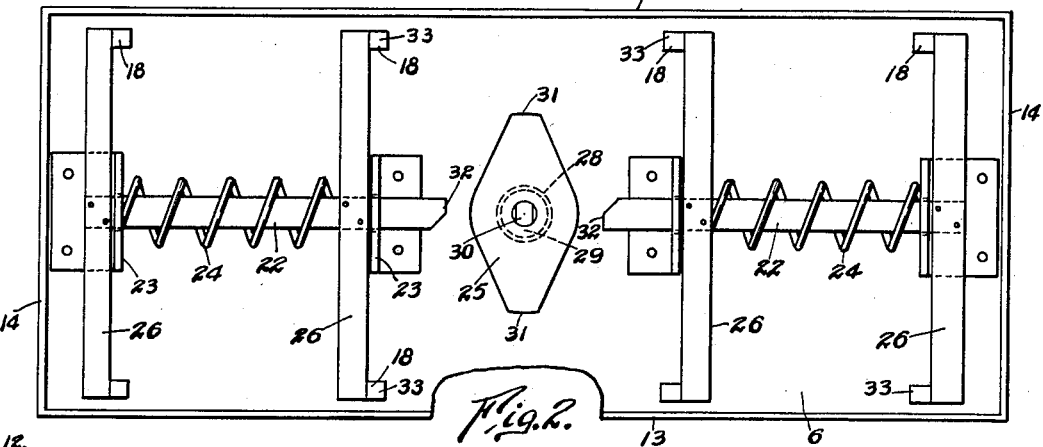
Fig. 2 is a plan view of a back member forming part of the device.
Figure 3:
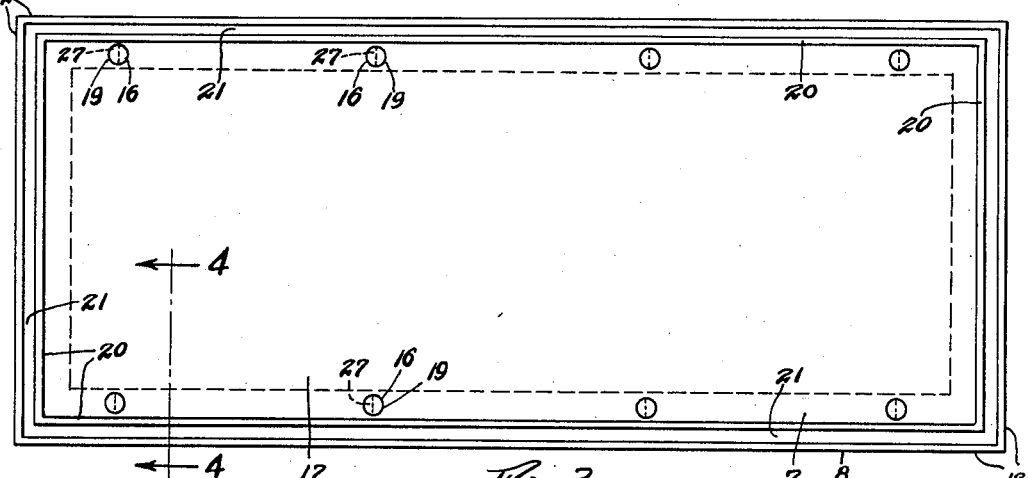
Fig. 3 is a plan view showing a double cover member which fits the back member of Fig. 2.
Figure 4:
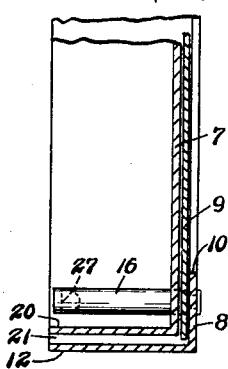
Fig. 4 is a fragmental cross-sectional view taken on line 4—4 of Fig. 3.

When the assembly of Fig. 3 is inverted and placed in position upon the back member of Fig. 2, the walls 12 of member 8 cover the walls of the back member, and the four walls 20 of member 7 fit within the confines of walls 13—14 of the back member. In other words, the walls 13—14 fit within the space 21 provided between the walls of members 7 and 8 (Fig. 3). Thus, it is practically impossible to gain access to the interior of the base or back member which houses the locking mechanism.

Figure 5:
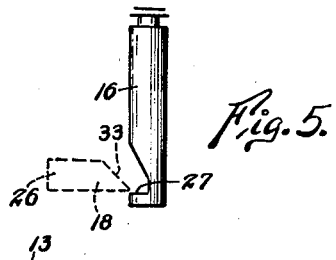
Fig. 5 is an elevational view of one of a series of latching elements of the invention.

The locking mechanism comprises one or more longitudinally shiftable latch bars 22 each of which is mounted upon brackets 23, with a spring 24 between, to urge the latch bars toward a central latch actuating cam or eccentric 25. The cross bars 26 are suitably fixed to the longitudinally shiftable latch bars so that the latch ends 18 may be caused to engage or disengage the slots or abutments 27 formed on the studs or keepers 16 (Figs. 3 and 5). To disengage the latches and keepers simultaneously, it is necessary only to rotate the cam or eccentric 25, but this may be done only after unlocking a lock which is indicated conventionally at 28. The lock 28 may be of any type, operated either by key or by the use of a combination dial and tumblers. The character of lock employed is immaterial to the invention, so long as it may be accessible from the back of the device. A key slot for the lock is indicated at 29, and 30 represents an angular end on the shaft of the lock, whereby the cam 25 is caused to rotate therewith when the lock is actuated. As is evident, the ends 31 of the cam are adapted to strike and move the ends 32 of the latch bars, upon rotation of shaft 30.

From the foregoing, it will be readily understood that destruction of the lock cannot be of assistance in throwing the latch bars to the retracted position. The compression springs 24, bearing against the angle brackets and cross bars as shown, maintain the latches always in engaged position with the studs when the device is assembled. Moreover, no actuation of the lock is necessary to assemble the device, for when the cover assembly of Fig. 3 is placed in position upon the back member in the manner above stated, the ends of the studs or keepers 16 strike the inclined faces 33 of the latches 18, and move the latch bars outwardly until the ends thereof snap into position.

It is to be understood that any number of cross bars 26 may be secured to the longitudinally shiftable members 22, to provide for additional latching points 18, and that one of the shiftable members 22 might readily be omitted, in which case the remaining member 22 would be made longer and the lock moved toward one end of the device.

What is claimed is:

1. A license plate holder comprising in combination a back member to be mounted upon a support, a windowed cover member and a plurality of keepers associated therewith to hold an apertured license plate, said keepers being fixed perpendicularly upon the cover member to enter the apertures of the license plate, and mechanism housed within the back member providing a self-latching connection between the keepers and the back member.

2. A license plate holder comprising in combination a back member to be mounted upon a support, a cover member bounding the back member, a window in the cover member, means associated with the cover member to hold a license plate in position to be observed through the window, mechanism housed within the back member providing a self-latching connection between the cover member and the back member, a movable actuator for rendering the self-latching mechanism inoperative, and a lock for controlling movement of said actuator.

3. A license plate holder comprising in combination a back member to be mounted upon a support, a cover member bounding the back member, a window in the cover member, means associated with the cover member to hold a license plate in position to be observed through the window, mechanism housed within the back member providing a self-latching connection between the cover member and the back member, a movable actuator for unlatching said self-latching connection, the actuator being housed between the back member and the cover member, and a lock accessible from the rear of the back member for controlling movement of said actuator.

4. A license plate holder comprising in combination a back member to be mounted upon a support, a cover member and means associated therewith to hold a license plate, mechanism housed within the back member providing a self-latching connection between the cover member and the back member, a movable actuator for unlatching said self-latching connection, the actuator being housed within the back member and the cover member, a lock accessible from the rear of the back member for controlling movement of said actuator, and a series of keepers carried by the cover member adjacent to the periphery thereof, for cooperation with the self-latching mechanism.

5. A license plate holder comprising in combination a back member having side and end walls, a cover member cooperating with the back member to provide a closed container, means associated with the cover member to hold a license plate, mechanism housed within the container for latching the cover member to the back member, said mechanism including a shiftable element and a series of latch ends carried by the shiftable element, a movable actuator associated with the shiftable element for moving the shiftable element to operative and inoperative positions, a series of keepers carried by the cover member and mounted thereon to project into the back member to positions engaging the latch ends, and means accessible exteriorly of the back member for normally precluding movement of the actuator.

6. A license plate holder comprising in combination a back member having side and end walls, a cover member cooperating with the back member to provide a closed container, means associated with the cover member to hold a license plate, mechanism housed within the container for the latching the cover member to the back member, said mechanism including a shiftable element and a series of latch ends carried by the shiftable element, a movable actuator associated with the shiftable element for moving the shiftable element to operative and inoperative positions, a series of keepers carried by the cover member and mounted thereon to project into the back member to positions engaging the latch ends, and means including a lock accessible exteriorly of the back member for normally precluding movement of the actuator.

7. In a device of the class described, the combination of a back member having side and end walls extending therefrom in a common direction, a series of latching elements disposed within the confines of the walls of the back member, means effecting unitary movement of the latching elements and including a movable actuator associated with the latching elements interiorly of the back member, means disposed exteriorly of the device for moving the actuator, an apertured cover member pan-like in formation and having walls fitting within the confines of the back member walls, a protective frame member having an apertured face and side and end walls to embrace the side and end walls of the back member exteriorly thereof, a series of keeper studs mounted upon the protective frame member for extension thereof through the apertures of the cover member, said keeper studs having abutments on their inner ends for cooperation with the latching elements, and a license plate having apertures therein coinciding with the apertures of the cover member, for reception of the keeper studs, said plate being disposed between the cover member and the protective frame so as to be observable through the aperture of the protective frame.

8. In a device of the class described, the combination of a back member having side and end walls extending therefrom in a common direction, a series of latching elements disposed within the confines of the walls of the back member, means effecting unitary movement of the latching elements and including a movable actuator associated with the latching elements interiorly of the back member, means disposed exteriorly of the device for moving the actuator, an apertured cover member pan-like in formation and having walls fitting within the confines of the back member walls, a protective frame member having an apertured face and side and end walls to embrace the side and end walls of the back member exteriorly thereof, a series of keeper studs mounted upon a portion of the apertured face of the protective frame member for extension thereof through the apertures of the cover member, said keeper studs having abutments on their inner ends for cooperation with the latching elements, and a license plate having apertures therein coinciding with the apertures of the cover member, for reception of the keeper studs, said plate being disposed between the cover member and the protective frame so as to be observable through the aperture of the protective frame.

9. In a device of the class described, the combination of a back member having side and end walls extending therefrom in a common direction, a series of latching elements disposed within the confines of the walls of the back member, means effecting unitary movement of the latching elements and including a movable actuator associated with the latching elements interiorly of the back member, means disposed exteriorly of the device for moving the actuator, an apertured cover member pan-like in formation and having walls fitting within the confines of the back member walls, a protective frame member having an apertured face and side and end walls to embrace the side and end walls of the back member exteriorly thereof, and a series of keeper studs mounted upon the protective frame member for extension thereof through the apertures of the cover member, said keeper studs having abutments on their inner ends for cooperation with the latching elements.

10. A license plate holder comprising a box-like back member, a protective frame member having side and end walls overlying parts of the back member, to provide a closed container, an apertured face on the frame member providing a substantially continuous flange covering the edges of an apertured license plate disposed behind the flange, and latch means normally holding the protective frame member in association with the back member said latch means including a series of studs mounted upon the apertured face of the frame member to extend through the apertures of the license plate.

11. A license plate holder comprising a box-like back member, a protective frame member having side and end walls overlying parts of the back member, to provide a closed container, an apertured face on the frame member for providing a substantially continuous flange covering the edges only of a license plate disposed behind the flange, and self-latching means normally holding the protective frame member in association with the back member.

12. A license plate holder comprising a box-like back member, a protective frame member having side and end walls overlying parts of the back member, to provide a closed container, an apertured face on the frame member for providing a substantially continuous flange covering the edges only of a license plate disposed behind the flange, and intermediate frame member providing a backing element for the license plate and including side and end walls lying inside the box-like back member, and self-latching means normally holding the protective frame member in association with the back member.

JESSE L. McMILLIN.